May 27, 1952 G. LEMETRE 2,598,568
DETACHABLE INSULATED HANDLE FOR HEATED VESSELS
Filed April 20, 1949
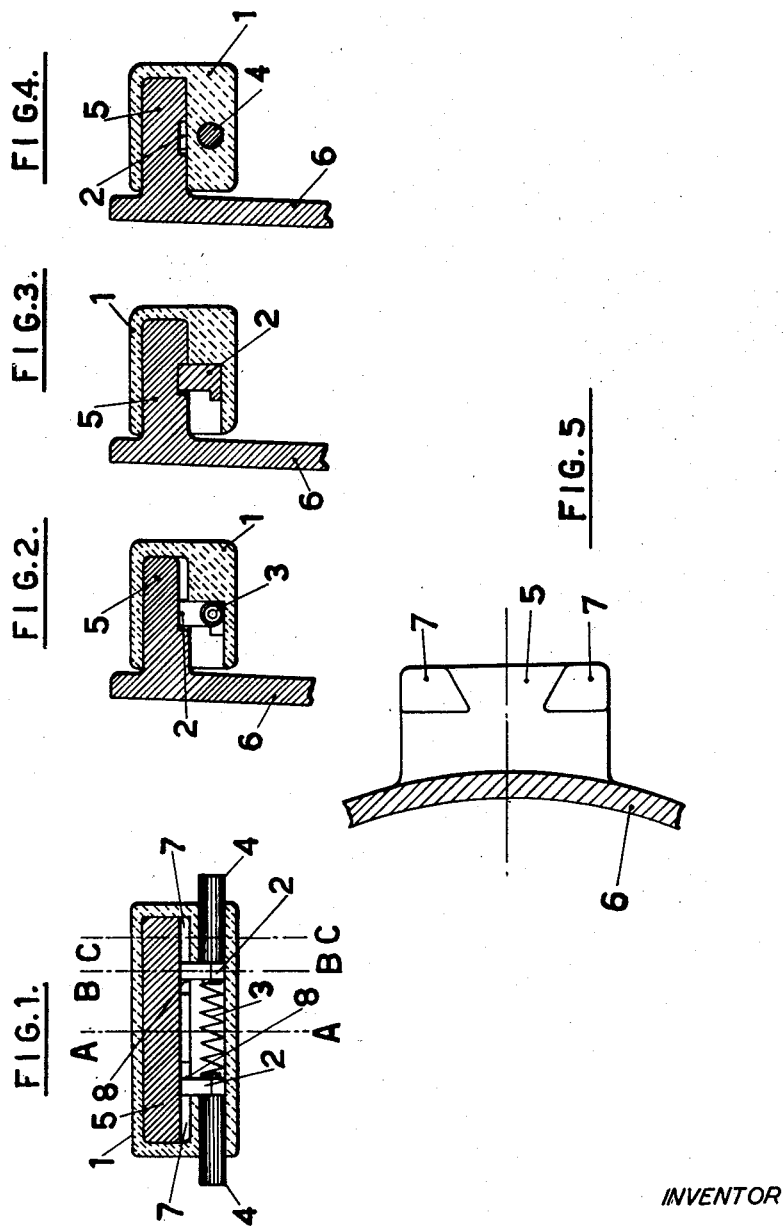
INVENTOR
GIUSEPPE LEMETRE
BY
Young, Emery + Thompson
ATTORNEYS Patented May 27, 1952

2,598,568

UNITED STATES PATENT OFFICE 2,598,568

DETACHABLE INSULATED HANDLE FOR HEATED VESSELS

Giuseppe Lemetre, Fidenza, Italy

Application April 20, 1949, Serial No. 88,612
In Italy April 29, 1948

1 Claim. (Cl. 16—114)

This invention relates to a device for handling vessels or the like when they are heated up to a temperature degree where a contact with the handle thereof is dangerous for the user.

Said device is characterized by the combination of at least one handle integral with the vessel and having gripping elements, with an insulating handle sheath provided with slidable connecting means for attachment to or removal from these gripping elements, said connecting means being spring-actuated and apt to be acted upon in such a manner as to allow the handle sheath to come into engagement with the handle of the vessel or to be separated therefrom.

In a preferred embodiment of the invention, the handle sheath consists in a hollow body of insulating material, within which the end projections of two aligned slidable pins apt to come into engagement with two gripping slots of the handle of the vessel, are subject to the action of a spring which tends to keep them wide apart in the right position for the engagement; the two slidable pins project from the handle sheath and permit the said spring to be pressed in such a manner as to cause the projections to get nearer and thus disengage themselves from the gripping slots.

In this way the handle sheath can be very easily and very quickly attached to and removed from the handle.

The device according to the invention can be advantageously employed for use with pots or other cooking utensils, small industrial boilers, containers designed to contain substances at freezing temperatures or even lower ones, in short with any whatever vessel which is to be lifted and transported when its temperature degree is either very high or very low. Said device is particularly apt to be used in connection with pots formed of glass, fire resistant, material the use of which is now becoming widespread.

One form of embodiment of the invention is illustrated in the annexed drawing, in which:

Fig. 1 is a longitudinal section along the slidable projections of a handle sheath according to the invention, said handle sheath being shown as adjusted on the handle of a vessel.

Fig. 2 is a cross section according to line A—A of Fig. 1.

Fig. 3 is a cross section according to line B—B of Fig. 1.

Fig. 4 is a cross section according to line C—C of Fig. 1.

Fig. 5 is a bottom view of a handle of the vessel.

In the hollow body 1 of parallelopiped shape, open at one of its sides and made of an insulating material, for instance a synthetic resinous material, the end projections 2 of two slidable pins 4 are slidably mounted in the said body, said projections being normally kept wide apart by a spring 3, the pins 4 projecting from the walls of the body 1.

This body 1, forming the handle sheath, is designed to be adjusted with its open side onto the handle 5 of the vessel 6, said handle presenting at its lower sides two lips 7 forming a radial slot bifurcating towards the vessel in two slots at right angle in opposed directions, substantially in parallel relation with the wall of the vessel, with which the projections 2 come into engagement for attaching the handle sheath to the handle when the handle sheath reaches the right position for its adjustment on the latter.

The working of the device will clearly appear, as above described, from the annexed drawing.

It is to be understood that the construction features of both the handle sheath and the handle can vary from the form of embodiment shown in the drawing and hereinbefore described without the device departing from the field of the invention.

I claim:

A vessel of the character described comprising, a body, a handle lug projecting horizontally from the body of the vessel, said lug having a radially extending central slot on one surface thereof communicating with a transverse slot extending perpendicularly to the radial slot and lying adjacent the body of the vessel, a handle sheath having a recess for receiving said lug, a pair of coaxial pins mounted in said sheath and projecting from the sides thereof, spring means urging said pins apart and gripping elements carried by the inner ends of said pins and adapted to be manually positioned to enter the radial slot and expandible by the spring means into the transverse slot to secure the sheath on the lug.

GIUSEPPE LEMETRE.

REFERENCES CITED

The following references are of record in the file of this patent:

UNITED STATES PATENTS

| Number | Name | Date |
|---|---|---|
| 597,574 | Dick | Jan. 18, 1898 |
| 1,635,119 | Dziuba | July 5, 1927 |
| 1,689,044 | Meyer | Oct. 23, 1928 |
| 2,254,571 | Hailey | Sept. 2, 1941 |